United States Patent [19]

Ida et al.

[11] Patent Number: 4,963,624

[45] Date of Patent: Oct. 16, 1990

[54] PROCESS FOR PRODUCING LIGHT-DIFFUSING METHACRYLIC RESIN ARTICLE

[75] Inventors: Kozo Ida, Tokyo; Tetsuya Horiuchi, Otake, both of Japan

[73] Assignee: Mitsubishi Rayon Co., Ltd., Tokyo, Japan

[21] Appl. No.: 307,629

[22] Filed: Feb. 7, 1989

[30] Foreign Application Priority Data

Feb. 17, 1988 [JP] Japan .................................. 63-34862

[51] Int. Cl.⁵ ............................................ C08F 265/04
[52] U.S. Cl. ...................................... 525/309; 525/308
[58] Field of Search ........................................ 525/309

[56] References Cited

U.S. PATENT DOCUMENTS 3,883,617 5/1975 Krieg et al. .
3,914,338 10/1975 Krieg et al. .

FOREIGN PATENT DOCUMENTS

| 0073450 | 3/1983 | European Pat. Off. ............ 525/309 |
| 0143991 | 6/1985 | European Pat. Off. ............ 525/309 |
| 297440 | 9/1951 | Japan . |
| 3910515 | 8/1961 | Japan . |
| 4611834 | 4/1966 | Japan . |
| 4643189 | 9/1968 | Japan . |
| 557471 | 8/1971 | Japan . |
| 54-155244 | 7/1979 | Japan . |
| 61-159440 | 7/1986 | Japan . |

OTHER PUBLICATIONS

U.S. Ser. No. 276,955

*Primary Examiner*—John C. Bleutge
*Assistant Examiner*—Vasu S. Jagannathan
*Attorney, Agent, or Firm*—Brumbaugh, Graves, Donohue & Raymond

[57] ABSTRACT

A process for producing a light diffusing methacrylic resin article consisting essentially of a substrate polymer and crosslinked polymer beads having an average particle diameter of 1–16 μm dispersed therein, the difference between the refractive indexes of the crosslinked polymer beads and the substrate polymer being 0.02–0.15, which comprises compounding the crosslinked polymer beads with:

(A) methyl methacrylate or a mixture of a major amount thereof with a minor amount of at least one comonomer;

(B) at least one monomer which can form a polymer compatible with the polymer obtained from (A); or (C) a polymer-in-monomer solution obtained by partially polymerizing either the (A) monomer or the (B) monomer, to swell the beads until a degree of swelling of from 120% to 1,500% is reached, and subjecting the resulting mixture to polymerization to obtain a light diffusing polymer and molding the polymer alone or in combination with a methacrylic resin, the main monomer unit of which is methyl methacrylate to a desired shape. The article obtained has a good balance between brightness and maximum bend angle, has such an opacity that a light source is not seen through the article and has a good appearance.

20 Claims, 1 Drawing Sheet

PROCESS FOR PRODUCING LIGHT-DIFFUSING METHACRYLIC RESIN ARTICLE

BACKGROUND OF THE INVENTION

1. FIELD OF THE INVENTION

The present invention relates to a process for producing a light-diffusing methacrylic resin article suitable as materials for light diffusion, for example, illuminated covers, illuminated signs, various displays, glazings, and rear projection, screens.

2. RELATED ART STATEMENT

As light-diffusing materials for illuminated covers, rear projection screens, and the like, which have heretofore been widely used, there are generally used materials produced by dispersing inorganic or organic, transparent, and fine particles in transparent synthetic resins.

In this case, as the transparent synthetic resins, there are used methacrylic resins, styrene resins, or vinyl chloride resins, and light-diffusion properties are attained by incorporating the transparent synthetic resin as substrate with, for example, inorganic transparent fine particles having an average diameter of 10 $\mu$m or less of barium sulfate, calcium carbonate, quartz, etc., which have a refractive index different from that of the transparent synthetic resin, or by coating such inorganic transparent fine particles on the surface of transparent synthetic resin (see Jap. Pat. Appln. Kokai (Laid-Open) No. 54-155241, Jap. Pat. Pub. No. 46-43189, and Japanese Utility Model Registration Examined Publication No. 29-7440). There are also known light-diffusing materials obtained by including polymer fine particles obtained by copolymerizing substituted or unsubstituted styrene with a polyfunctional monomer, in place of the above-mentioned fine particles (see Jap. Pat. Pub. No. 39-10515, 46-11834 and 55-7471).

The resins disclosed in these prior art references are intended to improve the diffusion properties and are fairly effective. However, in recent years, sufficiently effective utilization of light has become important in the case of illuminated covers, displays, etc., because of the need of energy conservation.

When the quantity of light from a light source is constant, one of desired properties of a light-diffusing material is to diffuse light in a required direction, namely, directively, with a minimum of light absorption. On the other hand, when a directional light-diffusing material is used in instruments such as illuminated covers or displays, it is required to be formed into a shape suitable for these instruments. Examples of the suitable shape are shapes for surrounding light sources, flat plate having fine mat finished surface, and regular shapes such as lenticular lens shape and Fresnel lens shape.

Therefore, there is desired a material which not only possesses improved light-diffusion properties but also can easily be molded to the above shapes. But, conventional materials cannot be said to have directive light-diffusion properties, and even when they have directivity, they are disadvantageous in that a light source is seen through them.

Further, the production of a light diffusing resin by blending crosslinked polymer beads with a substrate resin is disclosed, for example, in Japanese Patent Application Kokai No. 61-159,440, etc. In said production, the blend of the crosslinked polymer beads with the substrate resin is extrusion-molded or injection-molded.

The above prior art aims to improve the light diffuseness of a resin and exhibits a proper effect. However, it has been impossible to impart to the resin a light diffusion ability to such an extent that a light source is not seen through the resin and transmittance is not greatly decreased. Particularly, in the case of the blend of the crosslinked polymer beads with the substrate resin, the decrease in transmittance is considered to be due to the reflection or absorption of light at the interface between the beads and the substrate resin.

SUMMARY OF THE INVENTION

The present invention is intended to provide a novel light-diffusing material freed from these defects of the prior art.

According to the invention, there is provided a process for producing a light diffusing methacrylic resin article composed essentially of a substrate polymer and crosslinked polymer beads having an average particle diameter of 1–16 $\mu$m, dispersed therein, the difference between the refractive indexes of the crosslinked polymer beads and the substrate polymer being 0.02–0.15, which comprises compounding the crosslinked polymer beads with:

(A) methyl methacrylate or a mixture of a major amount thereof with a minor amount of at least one comonomer;

(B) at least one monomer which can form a polymer compatible with the polymer obtained from (A), C) a polymer-in-monomer solution obtained by partially polymerizing the monomer (A) or (B), thereby swelling the beads until a degree of swelling (mentioned hereinafter) of 120–1,500% is reached, subjecting the resulting mixture to polymerization to obtain a light diffusing polymer and molding the light diffusing polymer alone or in combination with a methacrylic resin, the main monomer unit of which is methyl methacrylate, to a desired shape.

Figure 1:
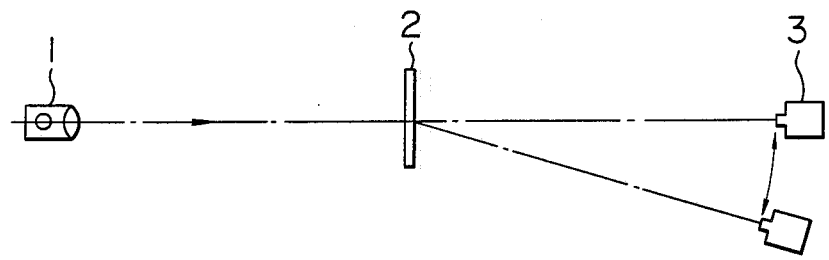
FIG. 1 is an illustration showing a measurement method of optical performance characteristics employed in examples of the present invention.

(1) light source
(2) sample
(3) luminance meter

DETAILED DESCRIPTION OF PREFERRED EMBODIMENT

The present invention is further explained hereunder in more detail.

The light-diffusion properties of light-diffusing materials which have been put into practical use are so good that the maximum bend angle ($\beta$-value) is 60° or more. The maximum bend angle ($\beta$-value) is defined as follows. When a light-diffusing material in which parallel ray comes perpendicular thereto is observed from the transmitted light side and the maximum gain is calculated from the equation:

$$G_o = \frac{\text{Foot-lambert (ft-L)}}{\text{Foot-candle (ft-cd)}},$$

the maximum bend angle ($\beta$-value) is an angle with the optical axis which is required for the gain to be reduced to $\frac{1}{3}$ $G_o$. The maximum bend angle ($\beta$-value) is a conventional parameter.

The present inventor investigated light-diffusing materials to which directivity could be imparted, and found the following facts. ① so long as a light source is not seen through the materials, the smaller the maximum bend angle ($\beta$-value), the easier the impartition- of directivity and the larger an attainable maximum gain ($G_o$). ② Conventional light-diffusing materials generally have a maximum bend angle ($\beta$-value) of 20° or more, and when the concentration of light-diffusing agent is lowered (namely, the light-diffusion properties are deteriorated) to adjust the maximum bend angle ($\beta$-value) to 10° or less, a light source is seen through the light-diffusing materials, so that these materials are limited in applications.

The present invention is intended to provide a light-diffusing material having such excellent light-diffusion characteristics that even when its maximum bend angle ($\beta$-value) is 10° or less, a light source is not seen through this material, or even if seen therethrough, becomes unable to be seen therethrough when a finely mat finished surface or a surface of lens shape such as Fresnel lens shape or lenticular lens shape is imparted to said material.

As the crosslinked polymer beads according to the present invention, there are used those having an average particle diameter of 1–16 $\mu$m which are obtained by subjecting to suspension polymerization at least one phenyl group containing monomer and if necessary, a monomer copolymerizable therewith, together with a polyfunctional monomer copolymerizable with these monomers, so as to adjust the concentration of the polyfunctional monomer in the crosslinked fine particles to 2 to 20%. The phenyl group containing monomer includes phenyl group containing vinyl compounds such as styrene, vinyl toluene, $\alpha$-methyl styrene, halogenated styrenes, and the like, and phenyl group containing (meth)acrylates such as phenyl (meth)acrylate, benzyl (meth)acrylate and the like. The copolymerizable monomer optionally added includes methyl (meth)acrylate, ethyl (meth)acrylate, butyl (meth)acrylate, 2-ethylhexyl (meth)acrylate, 2-hydroxyethyl (meth)acrylate, (meth)acrylic acid, maleic anhydride etc. The polyfunctional monomer includes diethylene glycol di(meth)acrylate, 1,3-butylene glycol di(meth)acrylate, trimethylolpropane tri(meth)acrylate, allyl (meth)acrylate, divinylbenzene, triallyl cyanurate, etc. Of course, the crosslinked polymer is not restricted to the above-mentioned one.

The light-diffusing polymer of the present invention is obtained by swelling the above-mentioned crosslinked polymer beads with:

(A) methyl methacrylate or a mixture of a major amount thereof with a minor amount of at least one comonomer, (B) at least one monomer which can form a polymer compatible with the polymer obtained from (A), or (C) a polymer-in-monomer solution obtained by partially polymerizing the monomer (A) or (B), and subjecting the mixture obtained to polymerization. The monomers (A), (B) and (C) include methacrylic acid butyl methacrylate, cyclohexyl methacrylate, 2-ethylhexyl methacrylate, phenyl methacrylate, benzyl methacrylate, 2-hydroxyethyl methacrylate, glycidyl methacrylate, dimethylaminoethyl methacrylate, diethylaminoethyl methacrylate, and the like; acrylic acid esters such as methyl acrylate, ethyl acrylate, butyl acrylate, cyclohexyl acrylate, 2-ethylhexyl acrylate, phenyl acrylate, benzyl acrylate, 2-hydroxyethyl acrylate, glycidyl acrylate, dimethylaminoethyl acrylate, diethylaminoethyl acrylate, and the like; methacrylic acid; and acrylic acid. In the case of (A), methyl methacrylate is the essential component and in the case of (B), any of the other monomers mentioned above is used as the essential component. Preferably, methyl methacrylate is used alone or in admixture with a minor amount of at least one comonomer other than methyl methacrylate of the above monomers. In the case of (C), a partial polymerization product (preferably polymerization conversion of 20%) (generally called syrup) of the (A) or (B) monomer is used, that is, a polymer-in-monomer solution in which the polymer is a polymerization product formed from the monomer. The (A), (B) or (C) monomer is collectively referred to hereinafter as the substrate monomer.

The substrate polymer of the present invention implies the part other than the crosslinked polymer beads of the above light diffusing polymer.

The light diffusing polymer of the present invention is obtained either in the form of beads by dispersing the crosslinked polymer beads in the substrate monomer to swell the beads with the substrate monomer, adding thereto a polymerization catalyst and optionally a polymerization regulator, a coloring material, an ultra-violet absorber, transparent fine grains of an inorganic compound such as barium sulfate, barium carbonate, calcium carbonate, silica, aluminum hydroxide, titanium oxide, or the like, and then subjecting the mixture obtained to a conventional suspension polymerization, or in the form of small pieces by subjecting the above mixture to bulk polymerization in a casting cell and optionally pulverizing the polymerization product.

In the present invention, the light diffusing methacrylic resin article is produced by molding the light diffusing polymer alone or optionally in admixture with a methacrylic resin to a desired shape by, for example, extrusion molding, press molding or injection molding.

In the present invention, the methacrylic resin which is optionally used along with the light diffusing polymer is a copolymer of a major amount of methyl methacrylate with a minor amount of a methacrylic acid ester other than methyl methacrylate copolymerizable therewith such as ethyl methacrylate, butyl methacrylate, cyclohexyl methacrylate, 2-ethylhexyl methacrylate, phenyl methacrylate, benzyl methacrylate, 2-hydroxyethyl methacrylate, glycidyl methacrylate, dimethylaminoethyl methacrylate, diethylaminoethyl methacrylate or the like; an acrylic acid ester such as methyl acrylate, ethyl acrylate, butyl acrylate, cyclohexyl acrylate, 2-ethylhexyl acrylate, phenyl acrylate, benzyl acrylate, 2-hydroxyethyl acrylate, glycidyl acrylate, dimethylaminoethyl acrylate, diethylaminoethyl acrylate or the like; methacrylic acid; acrylic acid; a polyfunctional (meth)acrylate such as diethylene glycol di(meth)acrylate, 1,3-butylene glycol di(meth)acrylate, trimethylolpropane tri(meth)acrylate, allyl (meth)acrylate, neopentylglycol di(meth)acrylate or the like; styrene; $\alpha$-methylstyrene; or maleic anhydride. However, the methacrylic resin is not restricted to the above ones.

The crosslinked polymer beads should be compounded with the substrate monomer so that after the resulting mixture is subjected to polymerization, the difference between the refractive indexes of the crosslinked polymer beads and the substrate polymer becomes in a range of from 0.02 to 0.15. The compounding ratio of the crosslinked polymer beads with the substrate monomer should be set up so that a degree of swelling of the crosslinked polymer beads with the monomer becomes in a range of from 120% to 1,500% [calculated as (volume after swelling/volume before swelling)×100]. If the degree of swelling is less than 120%, the light diffusing polymer article produced has too small a critical $G_o$ value at which a light source is not seen through the article. If the degree of swelling is more than 1,500%, the light diffusing polymer article produced has too small a proportion of greatly diffused rays to all the transmission rays to achieve the purpose of this invention.

When the percentage of particles having a diameter of 1 μm or less is too high, transmitted light will be undesirably colored yellow because of selective scattering of light having a short wavelength. On the other hand, when particles having a diameter of 30 μm or more are contained, glittering due to transmitted light undesirably occurs. Therefore, the average particle diameter is 1 to 16 μm, preferably 3–12 μm. The concentration by weight of the polyfunctional monomer is preferred to be in a range of 5–20%. When the concentration by weight of the polyfunctional monomer exceeds 20%, the light-diffusion ability will be deteriorated, namely, the maximum gain attained without making the light-diffusion material see-through to a light source will be lowered. On the other hand, when the concentration is less than 5%, the proportion of diffused light having a large bend angle will be too low in the case of comparison at the same maximum luminance.

The concentration by weight of the crosslinked polymer beads in the light-diffusing methacrylic resin should be 0.08 to 10% though it depends on the thickness in a direction of transmittance of light and desired diffusion properties and directivity for transmitted light.

EXAMPLES

The present invention is further illustrated with following examples, which should not be construed as limiting the scope of the invention.

[Measurement Method]

In the Examples, total light transmittance was measured in accordance with ASTM D1003-61.

A maximum gain $G_o$ and a maximum bend angle ($\beta$-value) were measured as follows:

A measuring instrument and a sample are placed as shown in FIG. 1. In FIG. 1, (1) shows a collimator mfd. by NIKON CORP., i.e., a light source, (2) shows a sample, and (3) shows a "AUTO SPOT", a luminance meter mfd. by MINOLTA CAMERA CO., LTD. Among them, the light source is set so as to cast light perpendicular to the surface of the sample (2), and its brightness is adjusted so as to adjust the illuminance on the surface of the sample (2) to 10 ft-cd. The luminance meter (3) is placed at a distance of 1 meter from the sample (2) on the extension of the line connecting the light source (1) to the sample (2) and the luminance on the surface of the sample (2) was measured while the meter (3) is turned around a locus formed by the sample (2). $G_o$ is calculated from these values. In addition the luminance meter (3) is rotated around an axis passing through the sample (2), whereby there is measured the maximum bend angle ($\beta$-value) at which the luminance on the surface of the sample (2) was $G_o/3$.

Average particle diameter was measured as follows. A cumulative percentage (by weight) histogram of particle diameter is prepared by means of COULTER COUNTER Model TA-II, mfd. by Coulter Electronics INC. CO., Ltd., and a particle diameter corresponding to 50% by weight is defined as average particle diameter. The degree to which a light source is seen through a sample and the appearance of a sample is judged by visual observation.

[Production of Crosslinked Polymer Beads]

EXAMPLE 1

Into a polymer were charged 90 parts by weight of styrene, 10 parts by weight of divinylbenzene, 0.1 part by weight of 2,2'-azobis(2,4-dimethylvaleronitrile) as polymerization initiator, 100 parts by weight of water, and 0.01 part by weight of 70% saponified sodium polyacrylate as dispersant, and the suspension polymerization was conducted with stirring at 80° C. After the polymerization, the particles thus obtained were washed, dried and then classified by means of an air micron separator to obtain crosslinked polymer beads having a desired particle diameter distribution. The average particle diameter of the crosslinked polymer beads is shown in Table 1.

EXAMPLES 2–18

The same procedure as in Example 1 was repeated, except that the composition of the charged monomers was changed as shown in Table 1, to obtain various kinds of crosslinked polymer beads. The average particle diameter of these kinds of crosslinked polymer beads are shown in Table 1.

[Production of Light Diffusing Polymer]

EXAMPLE 19

Into a polymerizer were charged 1,050 g of water, 1 g of 70% saponified sodium polyacrylate as dispersant, (i) 35 g, (ii) 2.8 g or (iii) 1.4 g of the crosslinked polymer beads of No. 1-3 in Table 1, 7 g of methyl acrylate and 693 g of methyl methacrylate, and the suspension polymerization was conducted with stirring at 80° C. After the polymerization, the particles thus obtained were washed and dried to obtain a light diffusing polymer. A light diffusing polymer of Run No. A-14, A-17 or A-18 in Table 2-1 was obtained according to (i), (ii) or (iii), respectively.

EXAMPLE 20

Each kind of crosslinked polymer beads listed in Table 1 were blended with 100 parts of a substrate monomer or monomer mixture as shown in Run Nos. A-1–A-13, A-15 and A-16 of Table 2-1, and sufficiently dispersed. To the resulting mixture were added 0.01 part by weight of dioctylsulfosuccinate sodium salt as a mold release agent and 0.04 part by weight of 2,2'-azobis(2,4-dimethylvaleronitrile) as polymerization initiator, and 0.4 part by weight of n-dodecylmercaptan as a polymerization degree regulator and dissolved and then poured into a mold which had been previously composed of two inorganic glass plates so as to adjust the thickness of a plate to be formed to 2 mm. This mold was immersed in a hot water bath at 65° C. for 180 minutes and then placed in an air bath at 120° C. for 120 minutes to complete the polymerization. After cooling, a resin plate was taken out of the mold and pulverized to particles of about 500 μm by a pulverizer to obtain a light diffusing polymer.

[Production of Light Diffusing Methacrylic Resin Plate]

EXAMPLE 21

The light diffusing polymer obtained in Example 19 or 20 was blended with 100 parts by weight of a copolymer of methyl methacrylate with methyl acrylate (composition ratio by weight 94:6) as a methacrylic resin in a compounding ratio as shown in Run Nos. 1–14 of Table 3-1, and was fully dispersed. The resulting mixture was extruded by an extruder kept at 250° C. and formed on three vertical-type calender rolls kept at about 80° C. to obtain a light diffusing methacrylic resin plate of 2 mm in thickness. The optical properties of the resin plates are shown in Run Nos. 1–14 of Table 3-1.

EXAMPLE 22

With 80 parts by weight of an acrylic resin ("Shikolite P VHP" mfd. by Mitsubishi Rayon Co., Ltd.) and 20 parts by weight of a copolymer of methyl methacrylate, methyl acrylate, butyl acrylate and styrene (composition ratio by weight 86:1:10:2) was compounded the light diffusing polymer of Run No. A-3 in Table 2-1 in the compounding ratio shown in Run No. 17 of Table 3-1 and was fully dispersed. The resulting mixture was extruded by an extruder kept at 240° C. and pelletized. The pellets obtained were molded to a sample plate of 2 mm in thickness by an injection machine. The optical property of the sample plate is shown in Run No. 17 of Table 3 1.

EXAMPLE 23

The pellets obtained in Example 22 were extruded by an extruder kept at 250° C. and molded on three vertical-type calender rolls kept at 80° C. to obtain a light diffusing methacrylic resin sample plate of 2 mm in thickness. The optical property of the sample plate is shown in Run No. 15 of Table 3-1.

EXAMPLE 24

The pellets obtained in Example 22 were put in a metal mold of 100 mm in diameter preheated to 150° C. and molded at a molding pressure of 100 kg/cm$^2$ by press molding to obtain a sample plate of 2 mm in thickness. The optical property of the sample plate is shown in Run No. 18 of Table 3-1.

EXAMPLE 25

The light diffusing polymer of Run Nos. A-15–A-18 is Table 2-1 was blended with 100 parts by weight of a copolymer of methyl methacrylate with methyl acrylate (composition ratio by weight 94:6) as a methacrylic resin in a compounding ratio as shown in Run Nos. 19–22 of Table 3-1, and was fully dispersed. The resulting mixture was extruded by an extruder kept at 250° C. and molded on three vertical-type calender rolls kept at 80° C. to obtain a light diffusing methacrylic resin sample plate. The optical property of the sample plate is shown in Run Nos. 19–22 of Table 3-1.

EXAMPLE 26

The light diffusing polymer of Run No. A-3 in Table 2-1 was blended with 100 parts by weight of a copolymer of methyl methacrylate with styrene (composition ratio by weight 60:40) in a compounding ratio as shown in Run No. 16 of Table 3-1, and fully dispersed. The resulting mixture was extruded by an extruder kept at 240° C. and molded on three vertical-type calender rolls to obtain a light diffusing methacrylic resin sample plate. The optical property of the sample plate is shown in Run No. 16 of Table 3-1.

COMPARATIVE TEST 1

With 100 parts by weight of a copolymer of methyl methacrylate with methyl acrylate (composition ratio 94:6) was compounded one of the light diffusing polymers of Run Nos. B-1 - B-4 in Table 2-2 in the corresponding compounding ratio shown in Run Nos. 23–26 of Table 3-2 and was fully dispersed. The mixture was extruded by an extruder kept at 250° C. and molded on three vertical-type calender rolls kept at 80° C. to obtain a light diffusing methacrylic resin plate of 2 mm in thickness. A light source was seen through each of the resin plates. The optical property of each of the resin plates is shown in Run Nos. 23–26 of Table 4-1.

COMPARATIVE TEST 2

A light diffusing methacrylic resin plate was prepared in the same manner as in COMPARATIVE TEST 1, except that the light diffusing polymer of Run No. B-6 in Table 2-2 was used in the compounding ratio shown in Run No. 28 of Table 3-2. A light source was not seen through the resin plate but glittering due to transmitted light occurred. The optical property of the resin plate is shown in Run No. 28 of Table 3-2.

COMPARATIVE TEST 3

A light diffusing methacrylic resin plate was prepared in the same manner as in COMPARATIVE TEST 1, except that the light diffusing polymer of Run No. B-5 in Table 2-2 was used in the compounding ratio shown in Run No. 27 of Table 3 2. A light source was seen through the resin plate. The optical property of the resin plate is shown in Run No. 27 of Table 3-2.

COMPARATIVE TEST 4

A light diffusing methacrylic resin plate was prepared in the same manner as in COMPARATIVE TEST 1, except that the light diffusing polymer of Run No. B-7 in Table 2-2 was used in the compounding ratio shown in Run No. 29 of Table 3-2. A light source was seen through the resin plate. The optical property of the resin plate is shown in Run No. 29 of Table 3-2.

COMPARATIVE TEST 5

A light diffusing methacrylic resin plate was prepared in the same manner as in COMPARATIVE TEST 1, except that the light diffusing polymer of Run No. B-8 in Table 2-2 was used in the compounding ratio shown in Run No. 30 of Table 3-2. A light source was seen through the resin plate. The optical property of the resin plate is shown in Run No. 30 of Table 3-2.

According to these Examples, excellent light diffusing methacrylic resin articles were obtained which had such an opacity that a light source is not seen therethrough in spite of their large $G_o$ values and particularly in spite of their $\beta$-values of less than 10° and caused neither yellowing nor glittering of transmission light.

The present invention is not restricted to the above Examples. The shape of the present article includes not only the flat plate shape but also Fresnel lens shape, lenticular lens shape, the sphere shape, the dish shape, the box shape and the like.

TABLE 1

[Constitution of crosslinked polymer beads]

| Example No. | Monomer composition of crosslinked polymer beads (% by weight) | | | | | Average particle diameter of crosslinked polymer beads (μm) |
|---|---|---|---|---|---|---|
| | Phenyl group containing monomer | component | Comonomer | Polyfunctional monomer | component | |
| 1-1 | St | (90) | — | DVB | (10) | 8.0 |
| 1-2 | St | (95) | — | DVB | (5) | 6.7 |
| 1-3 | St | (95) | — | DVB | (5) | 9.3 |
| 1-4 | St | (95) | — | DVB | (5) | 11.3 |
| 1-5 | St | (85) | — | DVB | (15) | 9.2 |
| 1-6 | St | (57) | MMA (38) | DVB | (5) | 7.7 |
| 1-7 | St | (47.5) | MMA (47.5) | DVB | (5) | 8.9 |
| 1-8 | St | (38) | MMA (57) | DVB | (5) | 7.3 |
| 1-9 | St | (95) | — | EDMA | (5) | 7.1 |
| 1-10 | PMA | (90) | — | AMA | (10) | 8.3 |
| 2-1 | St | (95) | — | DVB | (5) | 4.3 |
| 2-2 | St | (95) | — | DVB | (5) | 10.7 |
| 2-3 | St | (85) | — | DVB | (15) | 5.0 |
| 2-4 | St | (85) | — | DVB | (15) | 15.1 |
| 2-5 | St | (95) | — | DVB | (5) | 0.5 |
| 2-6 | St | (95) | — | DVB | (5) | 22.0 |
| 2-7 | St | (75) | — | DVB | (25) | 9.5 |
| 2-8 | St | (98) | — | DVB | (2) | 10.5 |

Note: St: Styrene, DVB: divinylbenzene, MMA: methyl methacrylate, PMA: phenyl methacrylate, EDMA: ethylene glycol dimethacrylate, AMA: allyl methacrylate

TABLE 2-1

[Constitution of light diffusing polymer]

| Run No. | Crosslinked polymer beads No. (Table 1) | Added amount (% by weight) | Substrate monomer composition (part by weight) | Production Example of light diffusing polymer | Average particle diameter of crosslinked beads in light diffusing polymer (μm) |
|---|---|---|---|---|---|
| A-1 | 1-1 | 20 | MMA (100) [P = 20%] | EXAMPLE 20 | 13 |
| A-2 | 1-2 | 20 | MMA (100) [P = 20%] | EXAMPLE 20 | 13 |
| A-3 | 1-3 | 20 | MMA (100) [P = 20%] | EXAMPLE 20 | 19 |
| A-4 | 1-4 | 20 | MMA (100) [P = 20%] | EXAMPLE 20 | 23 |
| A-5 | 1-5 | 20 | MMA (100) [P = 20%] | EXAMPLE 20 | 11 |
| A-6 | 1-6 | 20 | MMA (100) [P = 20%] | EXAMPLE 20 | 15 |
| A-7 | 1-7 | 20 | MMA (100) [P = 20%] | EXAMPLE 20 | 18 |
| A-8 | 1-8 | 20 | MMA (100) [P = 20%] | EXAMPLE 20 | 15 |
| A-9 | 1-9 | 20 | MMA (100) [P = 20%] | EXAMPLE 20 | 14 |
| A-10 | 1-10 | 20 | MMA (100) [P = 20%] | EXAMPLE 20 | 13 |
| A-11 | 1-3 | 5 | MMA (100) [P = 20%] | EXAMPLE 20 | 19 |
| A-12 | 1-3 | 20 | MMA (100) [P = 20%] | EXAMPLE 20 | 19 |
| A-13 | 1-3 | 20 | MMA (50)/MA (50) [P = 20%] | EXAMPLE 20 | 19 |
| A-14 | 1-3 | 5 | MMA (99)/MA (1) | EXAMPLE 19 (i) | 16 |
| A-15 | 1-3 | 0.52 | MMA (99)/MA (1) [P = 20%] | EXAMPLE 20 | 19 |
| A-16 | 1-3 | 0.26 | MMA (99)/MA (1) [P = 20%] | EXAMPLE 20 | 19 |
| A-17 | 1-3 | 0.4 | MMA (99)/MA (1) | EXAMPLE 19 (ii) | 16 |
| A-18 | 1-3 | 0.2 | MMA (99)/MA (1) | EXAMPLE 19 (iii) | 16 |

Note; [P] represents polymerization conversion.

TABLE 2-2

| Run No. | Crosslinked polymer beads No. (Table 1) | Added amount (% by weight) | Substrate monomer composition (part by weight) | Production Example of light diffusing polymer | Average particle diameter of crosslinked beads in light diffusing polymer (μm) |
|---|---|---|---|---|---|
| B-1 | 2-1 | 100 | — | — | 4 |
| B-2 | 2-2 | 100 | — | — | 11 |
| B-3 | 2-3 | 100 | — | — | 5 |
| B-4 | 2-4 | 100 | — | — | 15 |
| B-5 | 2-5 | 20 | MMA (100) | EXAMPLE 19 | 1 |
| B-6 | 2-6 | 20 | MMA (100) | EXAMPLE 19 | 44 |
| B-7 | 2-7 | 20 | MMA (100) | EXAMPLE 19 | 10 |
| B-8 | 2-8 | 20 | MMA (100) | EXAMPLE 19 | 26 |

TABLE 3-1

[Optical performance characteristics of resin plates]

| Light diffusion polymer Type of | Refractive index |
|---|---|

TABLE 3-1-continued

[Optical performance characteristics of resin plates]

| Run No. | crosslinked polymer (Table 2-1) | Amount (part by weight) | Methacrylic resin | difference between crosslinked polymer bead and substrate polymer | Molding method |
|---|---|---|---|---|---|
| 1 | A-1 | 0.2 | A | 0.11 | (1) |
| 2 | A-2 | 0.2 | A | 0.11 | (1) |
| 3 | A-3 | 0.3 | A | 0.11 | (1) |
| 4 | A-4 | 0.4 | A | 0.11 | (1) |
| 5 | A-5 | 0.5 | A | 0.11 | (1) |
| 6 | A-6 | 0.5 | A | 0.04 | (1) |
| 7 | A-7 | 0.6 | A | 0.05 | (1) |
| 8 | A-8 | 0.7 | A | 0.06 | (1) |
| 9 | A-9 | 0.2 | A | 0.11 | (1) |
| 10 | A-10 | 0.2 | A | 0.11 | (1) |
| 11 | A-11 | 0.2 | A | 0.11 | (1) |
| 12 | A-12 | 0.3 | A | 0.11 | (1) |
| 13 | A-13 | 0.3 | A | 0.11 | (1) |
| 14 | A-14 | 0.5 | A | 0.11 | (1) |
| 15 | A-3 | 0.3 | B | 0.11 | (1) |
| 16 | A-3 | 0.3 | C | 0.11 | (1) |
| 17 | A-3 | 0.3 | B | 0.11 | (2) |
| 18 | A-3 | 0.3 | B | 0.11 | (3) |
| 19 | A-15 | 50 | A | 0.11 | (1) |
| 20 | A-16 | 100 | A | 0.11 | (1) |
| 21 | A-17 | 50 | A | 0.11 | (1) |
| 22 | A-18 | 100 | A | 0.11 | (1) |

| Run No. | Total light transmittance (%) | $G_0$ | $\beta$ (deg) | Seeability of a light source through the resin plate | Appearance Yellowing | Glittering due to transmitted light |
|---|---|---|---|---|---|---|
| 1 | 85 | 50 | 4 | none | none | none |
| 2 | 85 | 50 | 4 | none | none | none |
| 3 | 84 | 50 | 7 | none | none | none |
| 4 | 84 | 50 | 7 | none | none | none |
| 5 | 86 | 50 | 4 | none | none | none |
| 6 | 82 | 50 | 7 | none | none | none |
| 7 | 82 | 50 | 7 | none | none | none |
| 8 | 82 | 50 | 7 | none | none | none |
| 9 | 85 | 50 | 5 | none | none | none |
| 10 | 87 | 50 | 7 | none | none | none |
| 11 | 85 | 50 | 7 | none | none | none |
| 12 | 84 | 50 | 7 | none | none | none |
| 13 | 84 | 50 | 7 | none | none | none |
| 14 | 84 | 50 | 7 | none | none | none |
| 15 | 84 | 50 | 7 | none | none | none |
| 16 | 85 | 50 | 7 | none | none | none |
| 17 | 84 | 50 | 7 | none | none | none |
| 18 | 84 | 50 | 7 | none | none | none |
| 19 | 85 | 50 | 6 | none | none | none |
| 20 | 85 | 50 | 6 | none | none | none |
| 21 | 85 | 50 | 6 | none | none | none |
| 22 | 85 | 50 | 6 | none | none | none |

Note;
(1) substrate polymer a: Copolymer of MMA with MA (94:6), B: Copolymer of MMA with MA, BA and St (86:1:10:2), C: Copolymer of MMA with St (60:40)
(2) Molding method (1): extruding molding, (2): injection molding, (3): press molding

TABLE 3-2

| Run No. | Light diffusion polymer Type of crosslinked polymer (Table 2-2) | Amount (part by weight) | Methacrylic resin | Refractive index difference between crosslinked polymer bead and substrate polymer | Molding method |
|---|---|---|---|---|---|
| 23 | B-1 | 0.2 | A | 0.11 | (1) |
| 24 | B-2 | 0.7 | A | 0.11 | (1) |
| 25 | B-3 | 0.2 | A | 0.11 | (1) |
| 26 | B-4 | 0.8 | A | 0.11 | (1) |
| 27 | B-5 | 0.1 | A | 0.11 | (1) |
| 28 | B-6 | 0.5 | A | 0.11 | (1) |
| 29 | B-7 | 0.2 | A | 0.11 | (1) |
| 30 | B-8 | 0.4 | A | 0.11 | (1) |

| Run No. | Total light transmittance (%) | $G_0$ | $\beta$ (deg) | Seeability of a light source through the resin plate | Appearance Yellowing | Glittering due to transmitted light |
|---|---|---|---|---|---|---|
| 23 | 83 | 50 | 2 | occurred | none | none |
| 24 | 84 | 50 | 3 | occurred | none | none |

TABLE 3-2-continued

| 25 | 83 | 50 | 2 | occurred | none | none |
|----|----|----|---|----------|------|------|
| 26 | 85 | 50 | 4 | occurred | none | none |
| 27 | 82 | 50 | 8 | occurred | occurred | none |
| 28 | 87 | 50 | 7 | none | none | occurred |
| 29 | 86 | 50 | 2 | occurred | none | none |
| 30 | 86 | 50 | 2 | occurred | none | none |

Note;
(1) Methacrylic resin A: Copolymer of MMA with MA (94:6)
(2) Molding method (1): extrusion molding

What is claimed is:

1. A process for producing a light diffusing methacrylic resin article consisting essentially of a substrate polymer and crosslinked polymer beads having an average particle size of 1-16 μm dispersed therein, the difference between the refractive indexes of the crosslinked polymer beads and the substrate polymer being 0.02-0.15, which comprises compounding the crosslinked polymer beads with:
   (A) methyl methacrylate or a mixture of a major amount thereof with a minor amount of at least one comonomer;
   (B) at least one monomer which can form a polymer compatible with the polymer obtained from (A); or
   (C) a polymer-in-monomer solution obtained by partially polymerizing either the (A) monomer or the (B) monomer,
to swell the beads until a degree of swelling of from 120% to 1,500% is reached, and subjecting the resulting mixture to polymerization to obtain a light diffusing polymer and molding the polymer alone or in combination with a methacrylic resin, the main monomer unit of which is methyl methacrylate to a desired shape.

2. A process for producing a light diffusing methacrylic resin article according to claim 1, wherein the molding is effected by extrusion molding, press molding or injection molding.

3. A process for producing a light diffusing methacrylic resin article according to claim 1, wherein an average particle diameter of the crosslinked polymer beads in a range of from 3 μm to 12 μm.

4. A process for producing a light diffusing methacrylic resin article according to claim 1, wherein methyl methacrylate is compounded with the crosslinked polymer beads.

5. A process for producing a light diffusing methacrylic resin article according to claim 1, wherein a polymer of methyl methacrylate having a polymerization conversion of 20% is compounded with the crosslinked polymer beads.

6. A process for producing a light diffusing methacrylic resin article according to claim 3, wherein methyl methacrylate is compounded with the crosslinked polymer beads.

7. A process for producing a light diffusing methacrylic resin article according to claim 3, wherein a polymer of methyl methacrylate having a polymerization conversion of 20% is compounded with the crosslinked polymer beads.

8. A process for producing a light diffusing methacrylic resin article according to one of claims 1 to 7, wherein the crosslinked polymer beads consist of a copolymer of a phenyl group containing vinyl compound with a polyfunctional monomer copolymerizable therewith.

9. A process for producing a light diffusing methacrylic resin article according to one of claims 1 to 7, wherein the crosslinked polymer beads consist of a copolymer of a phenyl group containing (meth)acrylate with a polyfunctional monomer copolymerizable therewith.

10. A process for producing a light diffusing methacrylic resin article according to claim 8, wherein the phenyl group containing vinyl compound is styrene.

11. A process for producing a light diffusing methacrylic resin article according to claim 9, wherein the phenyl group containing (meth)acrylate is phenyl methacrylate.

12. A process for producing a light diffusing methacrylic resin article according to claim 8 wherein the polyfunctional monomer is divinylbenzene.

13. A process for producing a light diffusing methacrylic resin article according to claim 8 wherein the polyfunctional monomer is ethylene glycol dimethacrylate.

14. A process for producing a light diffusing methacrylic resin article according to claim 8 wherein the polyfunctional monomer is allyl methacrylate.

15. A process for producing a light diffusing methacrylic resin article according to claim 8, wherein the phenyl group containing vinyl compound is styrene and the polyfunctional monomer is divinylbenzene.

16. A process for producing a light diffusing methacrylic resin article according to claim 8, wherein the phenyl group containing vinyl compound is styrene and the polyfunctional monomer is ethylene glycol dimethacrylate.

17. A process for producing a light diffusing methacrylic resin article according to claim 9, wherein the phenyl group containing (meth)acrylate is phenyl methacrylate and the polyfunctional monomer is allyl methacrylate.

18. A process for producing a light diffusing methacrylic resin article according to claim 9, wherein the polyfunctional monomer is divinylbenzene.

19. A process for producing a light diffusing methacrylic resin article according to claim 9, wherein the polyfunctional monomer is ethylene glycol dimethacrylate.

20. A process for producing a light diffusing methacrylic resin article according to claim 9, wherein the polyfunctional monomer is allyl methacrylate.

* * * * *